July 5, 1966    E. L. WILDING    3,259,228
CONVEYOR SLAT FOR BULK HANDLING OF TOBACCO
Filed July 27, 1964    2 Sheets-Sheet 1

INVENTOR.
EDWIN L. WILDING
BY Toulmin & Toulmin
ATTORNEYS

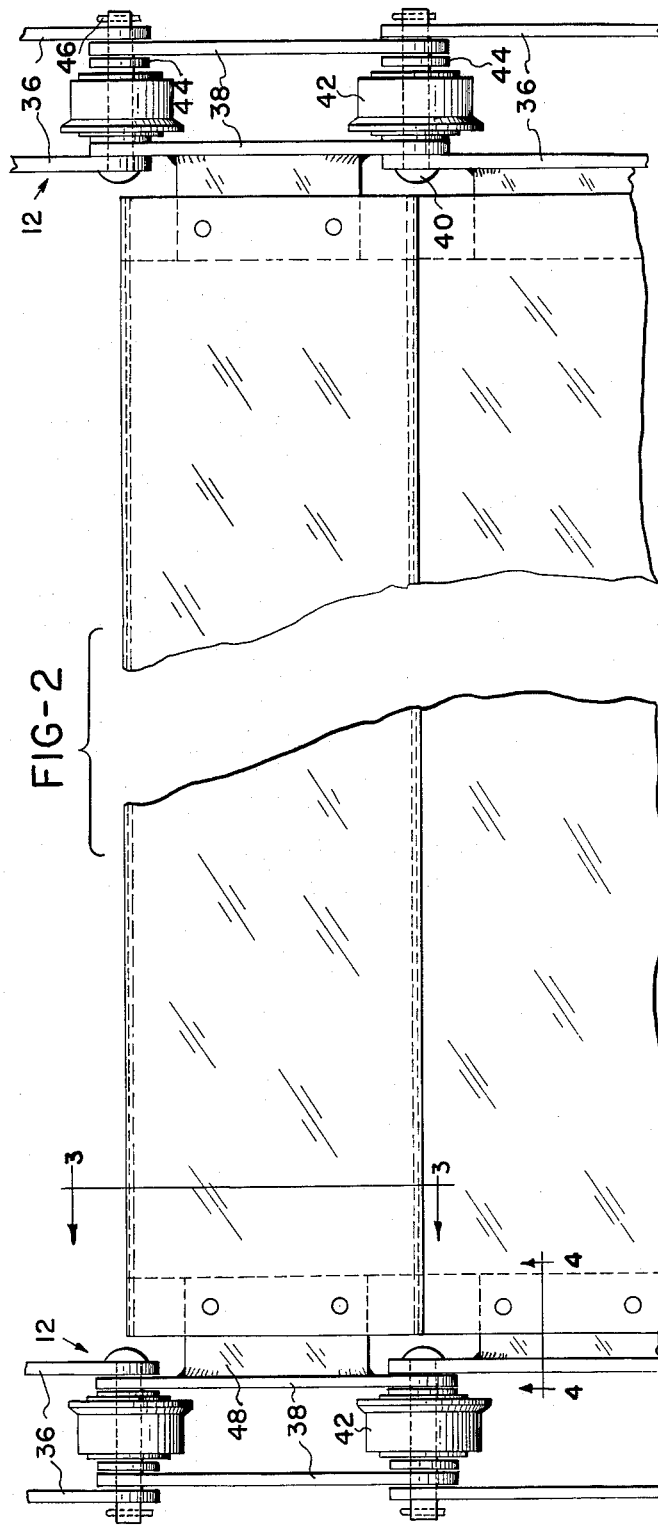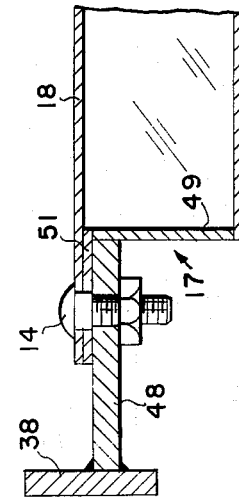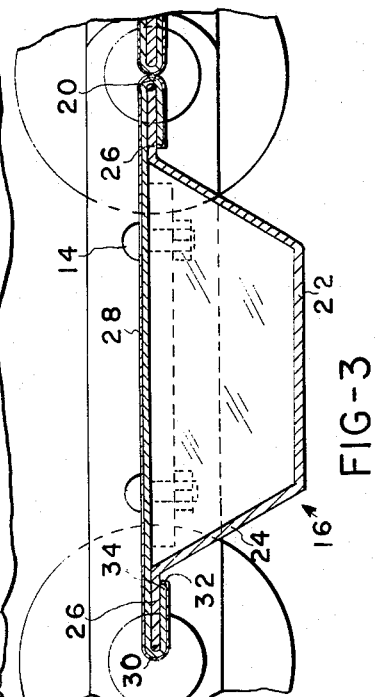

United States Patent Office 3,259,228
Patented July 5, 1966

3,259,228
CONVEYOR SLAT FOR BULK HANDLING OF TOBACCO
Edwin L. Wilding, Louisville, Ky., assignor to Griffin Industries, Inc., Louisville, Ky.
Filed July 27, 1964, Ser. No. 385,250
4 Claims. (Cl. 198—195)

The present invention relates to conveyors of the slat type construction, and is particularly concerned with the problem of eliminating conveyor sagging especially in connection with conveyors of extreme width, and is also concerned with the problem of providing a conveyor which is effective for handling bulk materials.

While conveyors of this construction may be employed for handling a variety of products, the problems with which this invention is concerned will be discussed in relation to the handling of a bulk material, such as tobacco.

An object of this invention is to produce a conveyor of economic construction which is suitably reinforced for conveyors having extreme widths.

Another object of this invention is to provide a conveyor construction in which the slat members comprising the conveyor are in substantially abutting engagement in order to provide, in essence, a continuous apron which is suitable for handling tobacco in bulk.

These and other objects and advantages will become apparent by reference to the following detailed description and accompanying drawings wherein:

FIGURE 2 is a plan view of the slat construction showing the means for attaching the individual slat members to the chain members;

FIGURE 3 is cross sectional view taken along lines 3—3 of FIGURE 2;

FIGURE 4 is a cross sectional view taken along lines 4—4 of FIGURE 2; and

Figure 1:
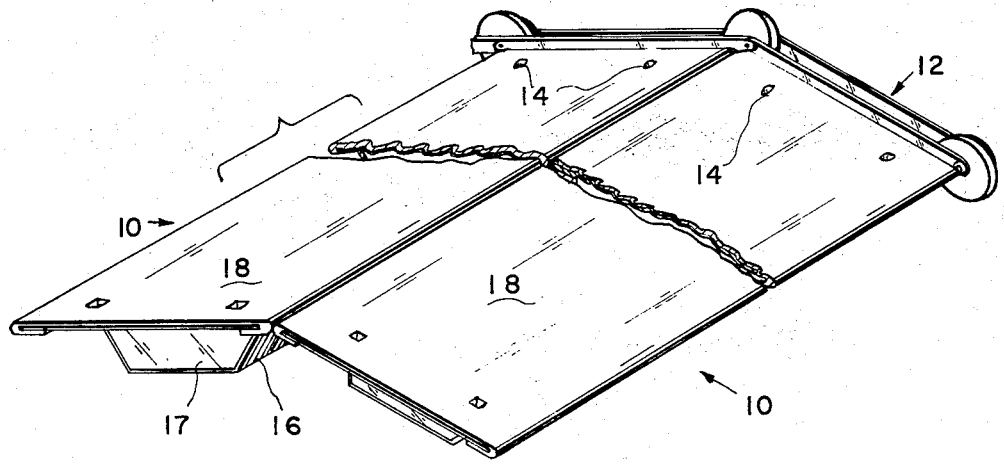
FIGURE 1 is a general perspective view of the slat members of this invention with one end secured to the chain members of the conveyor.

Referring to the drawings in more detail, FIGURE 1 shows a perspective view of the slat construction generally designated 10 with one end of the slat member connected to the chain members 12 by suitable fastener means 14. Portions of the reinforcing members 16 and 17 are also shown.

FIGURES 2 through 4 show the details of the slat construction and the method of attaching the slat members 10 to the chain link members generally designated 12.

The slat members generally designated 10 consist of an upper surface member 18 which extends across the width of the conveyor and has a reverse bend 20 in the side portion thereof, as indicated in FIGURE 3.

The reinforcing member generally designated 16 consists of a flat base portion 22 which is parallel to the upper surface member 18. There are side members 24 which extend upwardly and outwardly from base member 22 and are integrally attached thereto, as shown. At the upper portion 22 there are flange members 26 which extend outwardly, as shown, and are integrally attached to the side members 24. The flange portions 26 lie in a common plane and are inserted into the recesses formed by the reverse bends formed on the upper surface 18.

By this construction, the flanges are easily inserted in the reverse bends and provide some flexibility for the slat members in abutting against one another to maintain a tight surface between adjacent abutting slat members.

Where it is felt necessary, a suitable protective layer such as stainless steel may be superimposed over the upper surface member 18 as represented by numerals 28 in FIGURE 3. The stainless steel layer 28 also has reverse bend in the side portions thereof which are wrapped around the reverse bend portion 20 of upper surface layer 18 as shown. The extremities 32 of the layer 28 are wrapped around the innermost ends 34 of upper surface layer 18 as shown in FIGURE 3.

Referring to the dimensions of the specific embodiment of this invention, the length of the slat member 10 extending between chain link members 12 is approximately 90 inches and the width of the flat member is approximately 9 inches. The reinforcing member 24 was made of 10 gauge sheet metal while the upper surface member 18 was made of 14 gauge sheet metal. The stainless steel layer 28 was made of 26 gauge material. While these specific dimensions are given, it is undersood that other dimensions employing the construction here explained may be employed.

To mount the slat member 10 on the chain link members generally designated 12, the following construction was used. The chain link member 12 consists of a plurality of pairs of links 36 and 38 which are pivotally joined at their ends by link pin 40 which is inserted therethrough as shown. A suitable single flange roller 42 was rotatably mounted on pin 40 with suitable spacer washers 44 thereon. Cotter pins 46 were used to hold the construction together.

A link member 48 was joined to the inner link 38 as shown in FIGURES 2 and 4; end member generally designated 17 shown in FIGURES 1 and 4 is a right angle planar reinforcing member having a first leg portion 49 which is fixed to the reinforcing member 16 as by welding and also having a second leg portion 51 which is positioned beneath the upper surface member 18 as shown in FIGURE 4. The upper surface member 18, the second leg portion 51 and the link member 48 have suitable aligned apertures therein to receive a carriage bolt 14, which is used to secure these members together, as shown in FIGURE 4.

The slat members 10 are positioned between the link chain members 12 so that the outermost portions of the reverse bend in surface member 18 and stainless steel layer 28, where applicable, are in substantial alignment with the axis of link pins 40 when in the position shown in FIGURE 3.

In the specific embodiment disclosed in this invention the distance between axes of the link pin was 9 inches and the distance across the outermost portions of the upper surface member 18 was selected as $8\frac{31}{32}$ inches with a tolerance of plus zero and minus $\frac{1}{32}$. With the construction, the outermost edges 30, as shown in FIGURE 3, are in substantial abutment with the outermost edges of the adjacent slat members.

It should be noted that this slat construction has flexibility to bend with the chain link member in either direction without opening the gap between slat members. The actual predetermined clearance between the slat members can be maintained at all times, including the times during which the slat members are going over the discharge sprocket; and, in fact, this construction produces a continuous apron which is suitable for handling tobacco in bulk.

Figure 5:
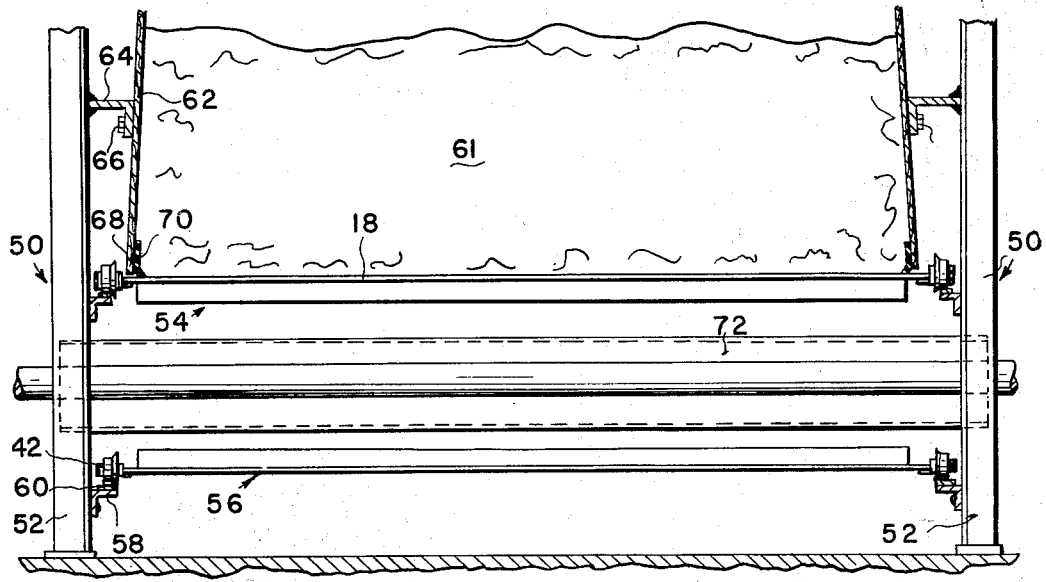
FIGURE 5 shows a modified side view of an installation employing the conveyor construction of this invention.

FIGURE 5 shows a generally modified side view of the conveyor construction of this invention. This construction includes support means generally indicated at 50 and having uprights 52 which are secured to the floor. The slat construction of this view is shown in an endless type conveyor arrangement with the bulk material being carried on conveyor 54, and the return conveyor shown at 56.

The means for mounting the chain link members 12 on the support means 50 comprise a generally angular bracket 58 which is secured to the upright 52 as shown. Rails 60 are mounted and secured to bracket 58 and provide the surface over which the single flange roller 42 rolls.

To secure the bulk material generally designated 61 on the conveyor surface 18, there are generally vertically depending members 62 which are fixed to support uprights 52 by suitable angular bracket 64 which is welded thereto and fastening means 66 which secure the bracket to the side panel 62.

At the lower portion 68 of the side member 62 there is a flexible selvage strip 70 which is secured to the inside thereof and has a lower surface engaging the slat members to retain the bulk material thereon.

Suitable known driving means shown schematically at 72 are used to drive the endless conveyor shown therein. The slat construction of this invention is designed to carry a 400 pound uniform load with a maximum deflection of ⅛ inch.

The actual capacity of the slat can be increased or decreased as required for a particular application. The slat members can also be made with a stainless steel overlay or plain as desired.

It will be understood that this invention is susceptible to modification in order to adapt it to different usages and conditions and accordingly, it is desired to comprehend such modifications within this invention as may fall within the scope of the appended claims.

What is claimed is:

1. A conveyor comprising; spaced parallel support rails, conveyor chain means on each side of said conveyor and adapted to be moved over said support rails and comprising a plurality of link members having holes in the ends thereof, link pins in said holes pivotally joining the ends of adjacent links, a flange roller rotatably mounted on each said link pin and adapted to roll over a respective one of said support rails, a plurality of slat members extending from side to side of the conveyor between said chain means, each said slat member being generally U-shaped in cross section and opening upwardly and having flange portions extending laterally outwardly from the upper ends of the legs thereof in a common plane, a generally planar surface member with each opposed side thereof having a reverse bend therein to provide a recess in which the pertaining said flange portions are secured, and means connecting the ends of said slat members with said chain means between a pair of said rollers, the side edges of each said slat member being in substantially abutting engagement with the side edges of the adjacent slat members to form a continuous apron for handling bulk materials the region of abutment of adjacent ones of said slats being stubstantially axially aligned with the axes of the supporting rollers of said flange rollers.

2. The conveyor as claimed in claim 1 in which said reinforcing member has a flat bottom portion which is parallel to the said common plane of said flange portions and said legs of said member being outwardly and upwardly divergent and integrally joined to said bottom portion and to said flange portions.

3. A conveyor comprising; spaced parallel support rails, conveyor chain means on each side of said conveyor and adapted to be moved over said support rails and comprising a plurality of link members having holes in the ends thereof, link pins in said holes pivotally joining the ends of adjacent links, a flange roller rotatably mounted on each said link pin and adapted to roll over a respective one of said support rails, a plurality of slat members extending from side to side of the conveyor between said chain means, with each slat member being positioned between an adjacent pair of said link pins, each said slat member being generally U-shaped in cross section and opening upwardly and having a flat bottom and outwardly and upwardly diverging side portions integrally formed therewith, flange portions extending outwardly from said side portion at the top edges thereof and lying in a common plane which is parallel to the plane of said flat bottom, a generally planar surface member with each opposed side thereof having a reverse arcuately shaped bend therein to provide a recess in which the pertaining flange portions are secured, said reinforcing member being open at the ends, a second right angle reinforcing member for each end of each slat member having a first vertical leg secured along its edge to said reinforcing member and a second horizontal leg positioned under said planar surface member at the ends thereof, a joining member for each end of each said slat member, fixedly secured to one of said link members and extending outwardly from the link member so as to be under said second leg, and fastener means securing said surface member, said second leg and said joining member together, the distance between the axes of adjacent link pins being a fixed distance, the width of each slat member as measured across the outermost portion of said reverse bends being such that the side edges of each slat member are in substantially abutting engagement with the side edges of the adjacent slat members to form a continuous apron for handling bulk materials, the region of abutment of said side edges of said slat member being substantially coaxial with said flange rollers.

4. A conveyor comprising; spaced parallel support rails, conveyor chain means on each side of said conveyor and adapted to be moved over said support rails and comprising a plurality of link members having holes in the ends thereof, link pins in said holes pivotally joining the ends of adjacent links, a flange roller rotatably mounted on each said link pin and adapted to roll over a respective one of said support rails, a plurality of slat members extending from side to side of the conveyor between said chain means, with each slat member being positioned between an adjacent pair of said link pins, each said slat member being generally U-shaped in cross section and opening upwardly and having a flat bottom and outwardly and upwardly diverging side portions integrally formed therewith, flange portions extending outwardly from said side portions at the top edges thereof and lying in a common plane which is parallel to the plane of said flat bottom, a generally planar surface member with each opposed side thereof having a reverse arcuately shaped bend therein to provide a recess in which the pertaining flange portions are secured, said reinforcing member being open at the ends, a second right angle reinforcing member for each end of each slat member having a first vertical leg secured along its edge to said reinforcing member and a second horiontal leg positioned under said planar surface member at the ends thereof, a joining member for each end of each said slat member fixedly secured to one of said link members and extending outwardly from the link member so as to be under said second leg, and stationary panel members on each side of said conveyor extending upwardly therefrom to hold bulk material therebetween the lower edges of said panel members being spaced upwardly from the tops of said slat members, and resilient selvage strips secured to the bottom edges of said panel members and engaging said slat members to retain bulk material on said slat members, the region of abutment of said side edges of said slat member being substantially coaxial with said flange rollers.

References Cited by the Examiner

UNITED STATES PATENTS

| | | | |
|---|---|---|---|
| 1,566,516 | 12/1925 | Baker et al. | 198—195 |
| 2,336,698 | 12/1943 | Morrill | 198—196 |
| 2,823,790 | 2/1958 | Sifford et al. | 198—196 |
| 3,174,618 | 3/1965 | Wesson | 198—195 |

FOREIGN PATENTS

| | | |
|---|---|---|
| 699,473 | 12/1930 | France. |
| 956,473 | 1/1957 | Germany. |

OTHER REFERENCES

German printed application, 1,000,281, January 1957.

EVON C. BLUNK, *Primary Examiner.*

SAMUEL F. COLEMAN, *Examiner.*

R. M. WALKER, *Assistant Examiner.*